June 16, 1936.　　　　　E. DAIBER　　　　　2,044,605
TWO-CYCLE COMBUSTION ENGINE
Filed Jan. 7, 1932
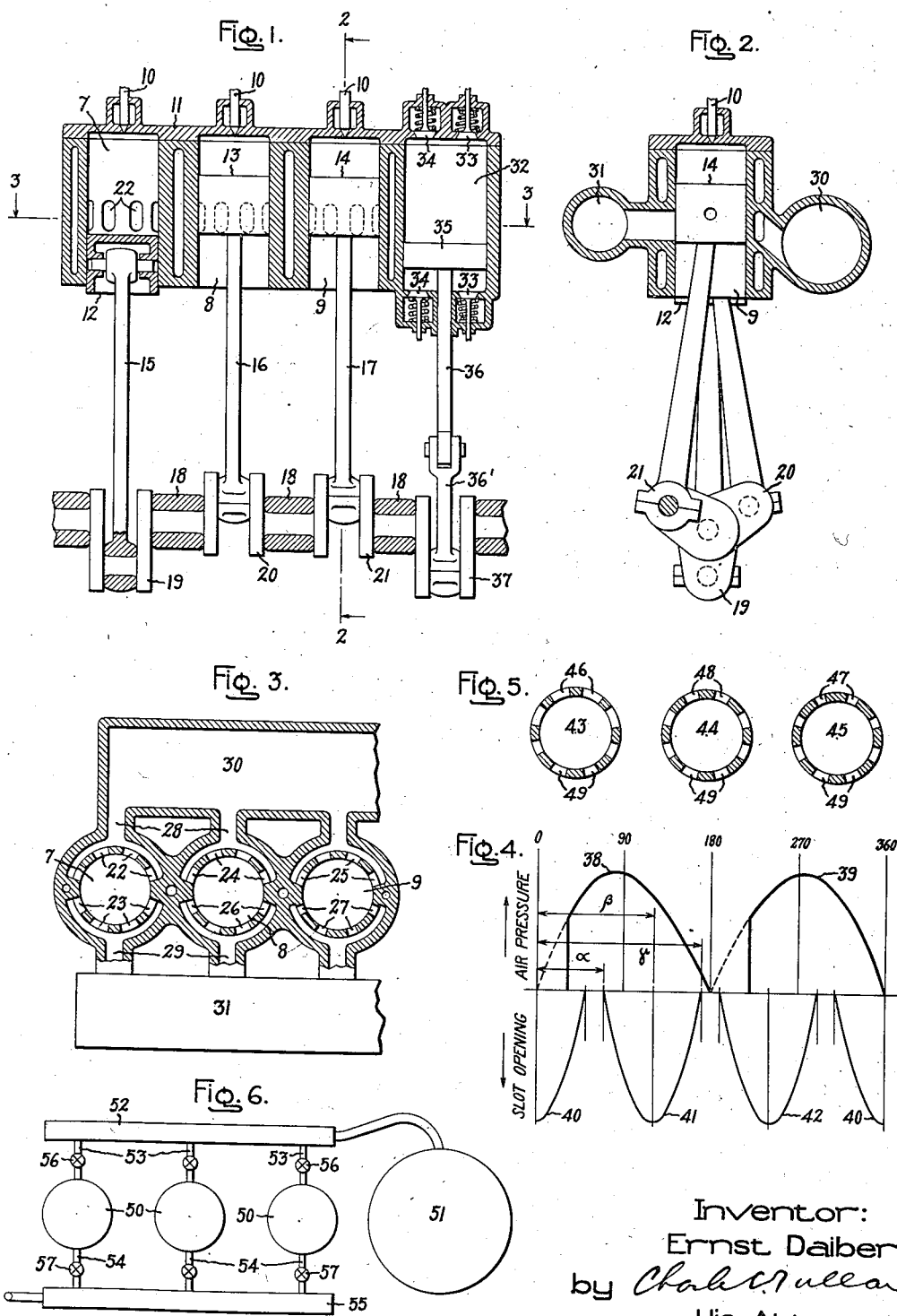
Inventor:
Ernst Daiber,
by Chas. ? Mullen
His Attorney Patented June 16, 1936

2,044,605

UNITED STATES PATENT OFFICE 2,044,605

TWO-CYCLE COMBUSTION ENGINE

Ernst Daiber, Lichterfelde-West, Germany, assignor to General Electric Company, a corporation of New York Application January 7, 1932, Serial No. 585,365
In Germany January 17, 1931

6 Claims. (Cl. 123—59)

The present invention relates to two cycle combustion engines, more particularly to that type of engine in which the burned gases are removed from the cylinders by supplying compressed air during each cycle to the individual cylinders. The scavenging air is normally supplied from a manifold through slots provided in the cylinders which are alternately uncovered and covered by the pistons of the cylinders. The supply of scavenging air to the individual cylinders takes place at different times, owing to the angular displacement of the cranks for driving the pistons of the cylinders. If, therefore the scavenging air is generated by a pumping means connected to the manifold the air pressure in the manifold will fluctuate and accordingly supply the air to the different cylinders at different pressures, to the effect that different amounts of scavenging air are supplied to the individual cylinders. This phenomenon will be more readily understood from the description below.

The object of my present invention is to provide an improved construction of combustion engines of the type above specified which serves to equally distribute the scavenging air among the different cylinders.

For a consideration of what I believe to be novel and my invention, attention is directed to the following description and the claims appended thereto in connection with the drawing which forms a part of my specification.

In the drawing, Fig. 1 is a fragmentary view of a two cycle internal combustion engine partly in section and partly diagrammatic; Fig. 2 is a cross section along line 2—2 of Fig. 1; Fig. 3 is a horizontal fragmentary view along line 3—3 of Fig. 1; Fig. 4 is an explanatory diagram showing the relation between the pressures in a part of Fig. 1 and port openings of the cylinders; and Figs. 5 and 6 show modifications embodying my invention.

Referring to Figs. 1, 2, and 3, where I have shown by way of example a three-cylinder two-cycle combustion engine, 7, 8, and 9 represent the cylinders. 11 designates a cover plate or head for the cylinders in which is provided a fuel inlet valve 10 for each of the cylinders. 12, 13, and 14 are the pistons movably arranged in cylinders 7, 8, and 9 respectively, and connected by means of piston stems 15, 16, and 17 respectively, to a crank shaft 18 which includes cranks 19, 20, and 21 for piston stems 15, 16, and 17 respectively. The cranks of the three cylinders are arranged in angular relation of 120° to each other, as shown in Fig. 2. Cylinder 7 is provided with intake ports or slots 22 and outlet or discharge ports or slots 23 through which scavenging air is supplied and discharged respectively for removing the burned gases during each cycle, as is well known in the art. Cylinders 8 and 9 are similarly provided with intake ports or slots 24 and 25 respectively and outlet or discharge ports or slots 26 and 27 respectively.

In the present instance I have shown the cylinders as comprising double walls, the inner walls being provided with the above mentioned slots and the outer walls having conduits 28 and 29 connected to a source of scavenging air or intake manifold 30 and to an outlet or discharge manifold 31 respectively. Compressed air is supplied to the intake manifold by suitable pumping means, in the present instance indicated as a double actuated pump including a cylinder 32 which is integrally formed with the casing or frame of the other cylinders of the engine and provided on each side with an inlet or intake valve 33 and an outlet or discharge valve 34. The discharge valves 34 are connected by any suitable means, not shown, to the manifold 30. 35 is the piston for the pump fastened to a stem 36 which in turn is connected by a connecting rod 36′ to a crank 37. The latter forms a part of the crank shaft and its angular position coincides with that of crank 19 for piston 12.

In order to clarify the problem which is solved by the present invention, attention is now directed to the diagram shown in Fig. 4 in which the upper full-line curves 38 and 39 indicate the pressure in the manifold plotted against the angular position of the crank shaft. These curves are alike and of a sinusoidal character, more clearly brought out by completing their left upper branches in dotted lines. It will be readily understood that the pressure conditions in the manifold are repeated cyclically and that one pressure cycle in the present instance is 180° with respect to one total revolution of the crank shaft in view of the provision of a double actuated pump. The lower curves 40, 41, and 42 respectively, indicate the port-opening of the cylinders 7, 8, and 9 during one total cycle. With respect to the port-opening of cylinder 8, shown by curve 41, it will be observed, for instance, that the slots are beginning to be uncovered at an angle $\alpha$ at which the pressure in the manifold is near its maximum and the slots are fully opened at angle $\beta$ at which the pressure in the manifold decreases and the slots are again completely closed at an angle $\gamma$ at which the pressure in the manifold is a little above zero or atmospheric pressure. It can be readily seen that the relation between the existing pressure in the manifold and the port-opening and -closing is different for each of the cylinders and in view of the fact that the amount of air passed through the cylinders is a function of the pressure existing in the manifold it will be clearly understood that with an ordinary arrangement different amounts of scavenging air are supplied to the individual cylinders. A change in the angular relation between the pump and the cylinders corresponding to a displacement between the upper and lower curves would change the condition but with ordinary means it would not be possible to obtain an equal distribution of air except in certain cases, such as two-cycle two-cylinder combustion engines where the opening and closing of the ports might be arranged so that during one stroke of the pump air is supplied to one cylinder and during the other stroke to the other cylinder. Thus it may sometimes occur that an insufficient amount of air is supplied to one of the cylinders which means that a part of the burned gases remains therein and prevents a sufficient amount of oxygen to be supplied for the following cycle, whereas an excessive amount of air may be supplied to another cylinder; both affect the efficiency of the engine in an undesirable manner.

This drawback is eliminated with my invention by making the resistance to the flow of air through at least one of the cylinders different from the resistance to the flow of air through another cylinder; in other words, by proportioning the resistance to the flow of air through the individual cylinders in such manner that an equal amount of scavenging air is supplied to each cylinder. The proportioning of the resistances to the flow of air through the cylinders may be achieved in different ways. In the present instance, I have indicated with respect to the embodiment shown in Figs. 1, 2, and 3, a suitable proportioning of the discharge ports or slots. From a consideration of Fig. 3 it will be readily seen that the discharge slots 23 of cylinder 7 are wider, whereas the discharge slots 27 of cylinder 9 are narrower than those of cylnder 8, to the effect that the resistance to the flow of air is decreased with respect to cylinder 7 and increased with respect to cylinder 9. This permits a greater volume of air at a lower pressure to be forced through cylinder 7 and a smaller volume of air at a higher pressure to be forced through cylinder 9, to the effect that an equal amount of air is supplied to each of the cylinders. With "amount of air" I mean the product of the volume of air and its pressure or the volumes of air referred to the same pressure. From the foregoing it will be understood that the volume of air forced through a cylinder is increased by decreasing the resistance to the flow of air when the existing pressure during the opening of the ports of this cylinder is lower than during the opening of the ports of another cylinder. Whereas, in Fig. 3 I have shown a proportioning of the resistances to the flow of air by providing different opening areas for the outlet ports, I have shown in Fig. 5 another arrangement in which the opening areas with respect to the intake ports are suitably proportioned. The intake ports 46 of cylinder 43 are wider and the intake ports 47 of the cylinder 45 are narrower than the intake ports 48 of cylinder 44, whereas the outlet ports 49 of the three cylinders are alike. This arrangement would have substantially the same effect as that of Fig. 3.

Fig. 6 shows a diagrammatic view of a combustion engine comprising combustion cylinders 50, a pumping cylinder 51 connected to a manifold 52 which in turn is connected by conduits 53 to the cylinders. 54 represents conduits between the cylinders and a discharge manifold 55. It is assumed that all of the cylinders are provided with intake and discharge ports or slots of the same port-opening areas. In order to equally distribute the scavenging air among the cylinders I provide in the intake or the discharge conduits, or in both, suitable throttling means or valves 56 and 57 respectively. It will be readily understood that by suitably adjusting these valve means the resistances to the flow of air through the different cylinders can be easily proportioned so that equal amounts of air are supplied to the individual cylinders.

With my invention I have accomplished a simple and reliable construction for efficiently scavenging the cylinders of a multi-cylinder combustion engine.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In combination with a two-cycle multi-cylinder combustion engine, a source of scavenging air under periodically fluctuating pressure including reciprocating pumping means driven from the engine, and means for conveying air from the source to each of the cylinders, the resistance to the flow of air through at least one of the cylinders being different from the resistance to the flow of air to another cylinder, said resistances being proportioned to distribute the air among the cylinders so as to obtain equal scavenging action in all cylinders at periodically fluctuating air pressure of said source.

2. In combination with a two-cycle multi-cylinder combustion engine, a source of scavenging air under periodically fluctuating pressure including reciprocating pumping means driven from the engine, and means for conveying the scavenging air from the source to each of the cylinders, each of the cylinders having intake and discharge ports, at least one port of at least one cylinder having an opening area different from the opening area of a port of another cylinder, the opening areas being proportioned to distribute the air equally among the cylinders.

3. In combination with a two-cycle multi-cylinder combustion engine, a manifold, means for supplying air under periodically fluctuating pressure to the manifold including reciprocating pumping means driven from the engine, conduits for conveying scavenging air from the manifold to each of the cylinders, conduits for discharging air and burned gases from each of the cylinders, and valve means in at least one of these conduits for equally proportioning the conveying of air to the cylinders.

4. In combination with a two-cycle multi-cylinder combustion engine, an intake manifold connected to each of the cylinders, reciprocating pumping means driven by the engine for periodically supplying air under fluctuating pressure to the manifold, a discharge manifold connected to each of the cylinders, and means for equally distributing the scavenging air to each of the cylinders.

5. In combination with a two-cycle multi-cylinder combustion engine, a comparatively small container for scavenging air for all cylinders in which container the air pressure fluctuates periodically, and conduit means for conducting scavenging air to each cylinder, thereby characterized that said conduit means has a small resistance to flow of air to one of the cylinders receiving air from the container while the pressure therein is low, and a higher resistance to flow of air to another cylinder receiving air from the container while the pressure therein is high in order to insure the same scavenging effect in all cylinders.

6. In combination with a two-cycle multi-cylinder combustion engine, a comparatively small container for scavenging air for all cylinders, conduit means for conducting air from the container through a cylinder port offering a low resistance to flow of air through one of the cylinders and a second conduit means to conduct air through a cylinder port offering a high resistance to flow of air through another cylinder, reciprocating pumping means having a piston driven by the engine for pumping air into the container, the angular relation between the piston of the reciprocating pumping means and the pistons of the combustion engine cylinders being such that with periodic fluctuations of air pressure in the container equal scavenging effect is obtained in all of the combustion engine cylinders.

ERNST DAIBER.